(No Model.) 2 Sheets—Sheet 1.
T. C. MUNZ.
VEHICLE RUNNING GEAR.
No. 327,405. Patented Sept. 29, 1885.
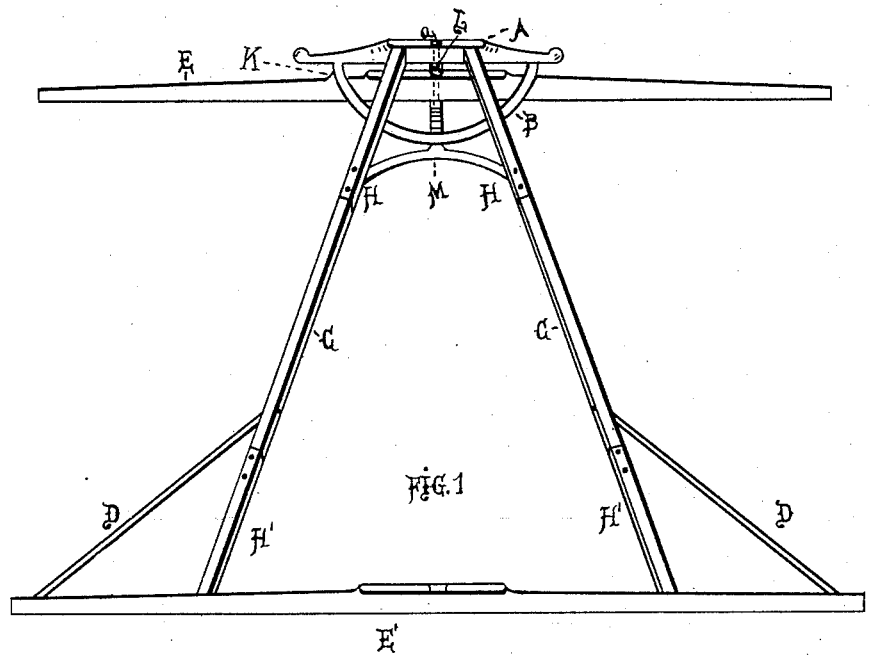
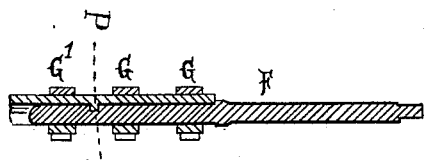
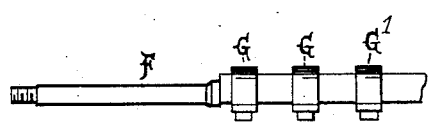
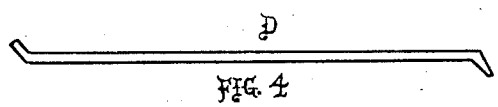
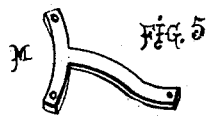
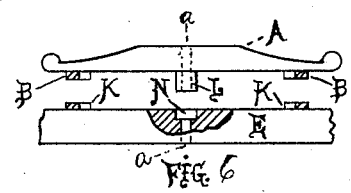
WITNESSES
John P. Delphey.
Corydon W. Munson.
INVENTOR
Theodore Charles Munz
by B. F. Reno attorney (No Model.) 2 Sheets—Sheet 2.

T. C. MUNZ.
VEHICLE RUNNING GEAR.

No. 327,405. Patented Sept. 29, 1885.

WITNESSES
John P. Delphey.
Corydon W. Munson.

INVENTOR
Theodore Charles Munz
by — I. S. Reno, attorney

UNITED STATES PATENT OFFICE.

THEODORE CHARLES MUNZ, OF TOLEDO, OHIO.

VEHICLE RUNNING-GEAR.

SPECIFICATION forming part of Letters Patent No. 327,405, dated September 29, 1885.

Application filed August 21, 1884. (No model.)

*To all whom it may concern:*

Be it known that I, THEODORE CHARLES MUNZ, a citizen of the United States, residing at Toledo, in the county of Lucas and State of Ohio, have invented certain new and useful Improvements in Vehicle Running-Gears; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in vehicle running-gears, such as road-wagons, carriages, and means of conveyance of a kindred nature; and it consists of a vehicle running-gear made of malleable iron in the manner hereinafter described, the elements of the same being made integral with one another as far as practicable, and the whole cast in as few sections as possible, so that the different elements may perform their several functions.

The object of my invention is to produce a running-gear of malleable iron which shall be strong, light, made in few sections, and easily put together. I attain these objects as illustrated in the accompanying drawings and explained in this specification.

Referring to the drawings, Figure 1 represents a perspective top view of my improved vehicle running-gear with the spindles detached. Fig. 2 is a vertical section of one end of an axle-bed with its spindle. Fig. 3 is an elevation of the same. Fig. 4 is a view of one of the braces for connecting the intermediate reaches with the rear axle-bed. Fig. 5 is a view of the king-bolt brace. Fig. 6 is an elevation showing the head-block A and a portion of the front axle-bed. Fig. 7 is a perspective view of the head-block section inverted. Fig. 8 is a view of the front axle-bed inverted. Fig. 9 is a similar view of the rear axle-bed.

Similar letters refer to similar parts throughout the several views.

The first section consists of the head-block A, the same having the upper fifth-wheel, B, the annular projection L, and the forward reaches, H H, made integral with one another. Fig. 7 shows in perspective this section inverted. The second section consists of the axle-bed E, having cast integral with it the lower fifth-wheel, K. Fig. 8 shows in perspective the second section inverted. The third section consists of the rear axle-bed, E', having the rear reaches, H' H', made integral with it. Fig. 9 shows in perspective the third section inverted. Fig. 4 shows in perspective one of the rear braces D. Fig. 5 shows in perspective the king-bolt brace M. All of the foregoing sections are made independently of one another, and are made of malleable iron, as hereinbefore defined and specified.

The intermediate reaches, C C, are preferably made of wood, and on the ends of the same are formed tenons, so as to make a joint with the mortises J J.

Fig. 2 represents a vertical section of one of the spindles and a portion of one of the axle-beds, showing the projecting keys P, which are made integral with the axle-beds. One of these keys is located near each end of each axle-bed. This view also shows the socket S in the spindle, into which the key P fits.

Fig. 3 is a perspective view of a portion of one of the axle-beds, showing the manner of securing the spindle thereto. G, G, and G' are clips of well-known construction.

Fig. 6 represents a portion of section one, showing the annular projection L, and in the same figure is shown a portion of section two, showing the recess N, into which the projection L is inserted, and forms a bearing.

Figure 7:
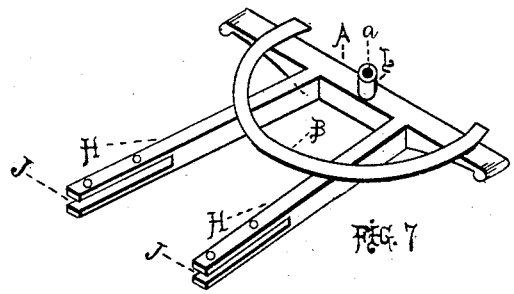
Figure 8:
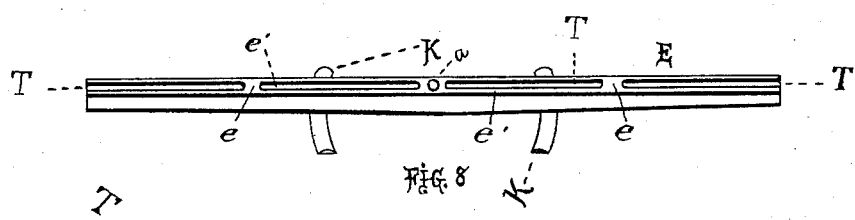
Figure 9:
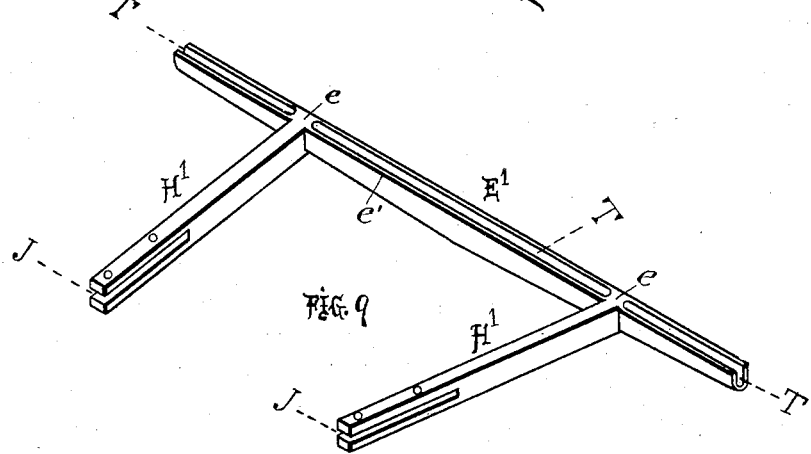

The spindles F are preferably made of steel, and in the arm of the same there is an opening, S, in which the projection or key P fits, which prevents the spindle from shifting in the axle-bed.

Fig. 2 illustrates the spindle-socket S and projection or key P.

The object of furrowing the axle-beds, as indicated by T, is to decrease the weight of the same and to cause the same to anneal uniformly. It is not, however, desirable to make the axle-beds of a simple U cross-section throughout without connecting-webs between the two sides to give the necessary stiffness. To connect by a bottom plate conforming to the shape of the axle-beds renders the construction both heavy and expensive, and adds to the number of pieces, as such plate cannot conveniently be cast with the bed, or, if so cast, would interfere with the attachment of the spindles. I have therefore provided the bed with transverse webs e, cast integral with the bed, and connecting and stiffening the parallel walls e'.

When it is desired to form a vehicle running-gear with the elements and sections herein described, section one and section two will be connected to the intermediate reaches by bolts, as shown in Fig. 1. The braces D D will be secured to the reaches C C also by bolts, and to the axle-bed E' by a clip, as G'. The king-bolt brace will be secured to the reaches H H by bolts, and will be secured under the axle-bed E by the king-bolt, which passes through the opening a, which opening extends through the head-block A, the annular projection L, the axle-bed E, and the king-bolt brace M, as shown in Figs. 6 and 5.

What I claim as new, and desire to secure by Letters Patent, is—

1. In a vehicle running-gear, the combination, with the rear axle-bed, E', having the longitudinal recess T, forming walls e', of the reaches H' H', cast in one piece of metal with one of said walls, and partitions e, integral with and connecting and stiffening the walls e' at the junction of said reaches, substantially as set forth.

2. In a vehicle running-gear, the combination, with the front axle-bed and head-block having the reaches H H, of the rear axle-bed, the reaches H' H', formed integral therewith, the intermediate pieces, C, and the braces D, arranged to prevent lateral flexion of the reach-sections at their joints, said sections being formed of malleable cast-iron, substantially as set forth.

In testimony whereof I have affixed my signature in presence of two witnesses.

THEODORE CHARLES MUNZ.

Witnesses:
BENJAMIN F. RENO,
J. P. DELPHEY.